July 14, 1931.  C. D. KOCH  1,814,315
REFRIGERATOR FOR VEHICLES
Filed Aug. 15, 1928   2 Sheets-Sheet 1
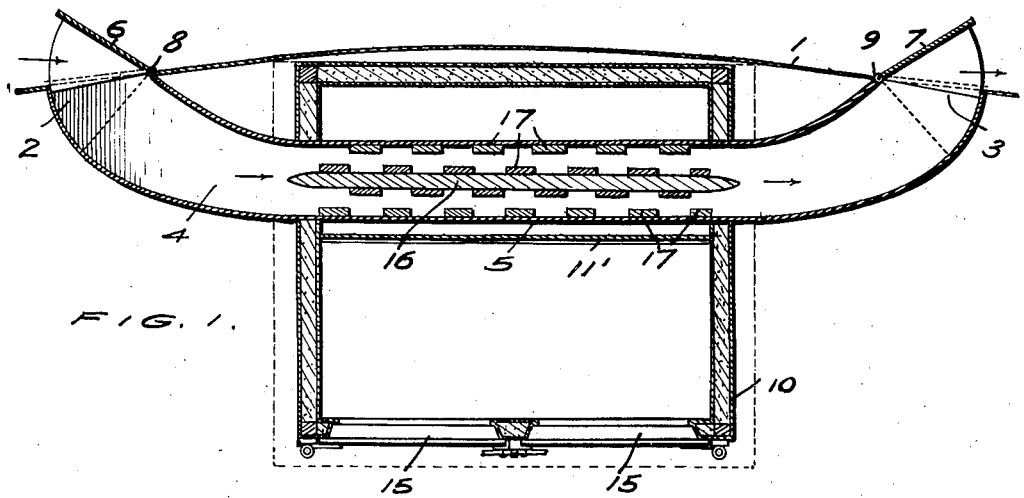
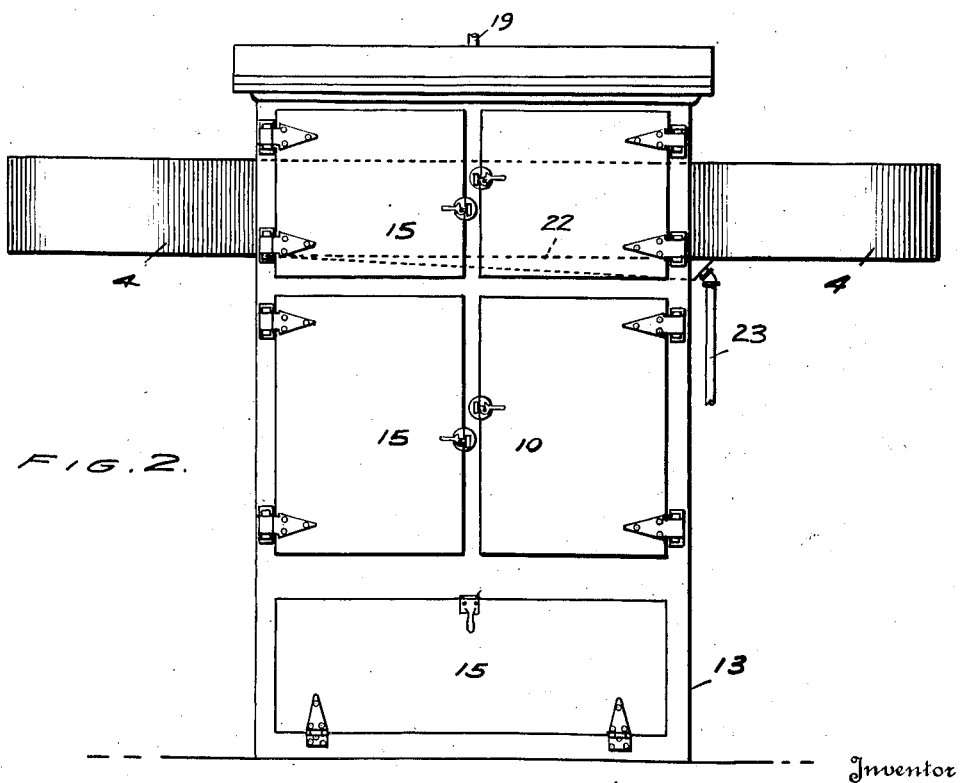

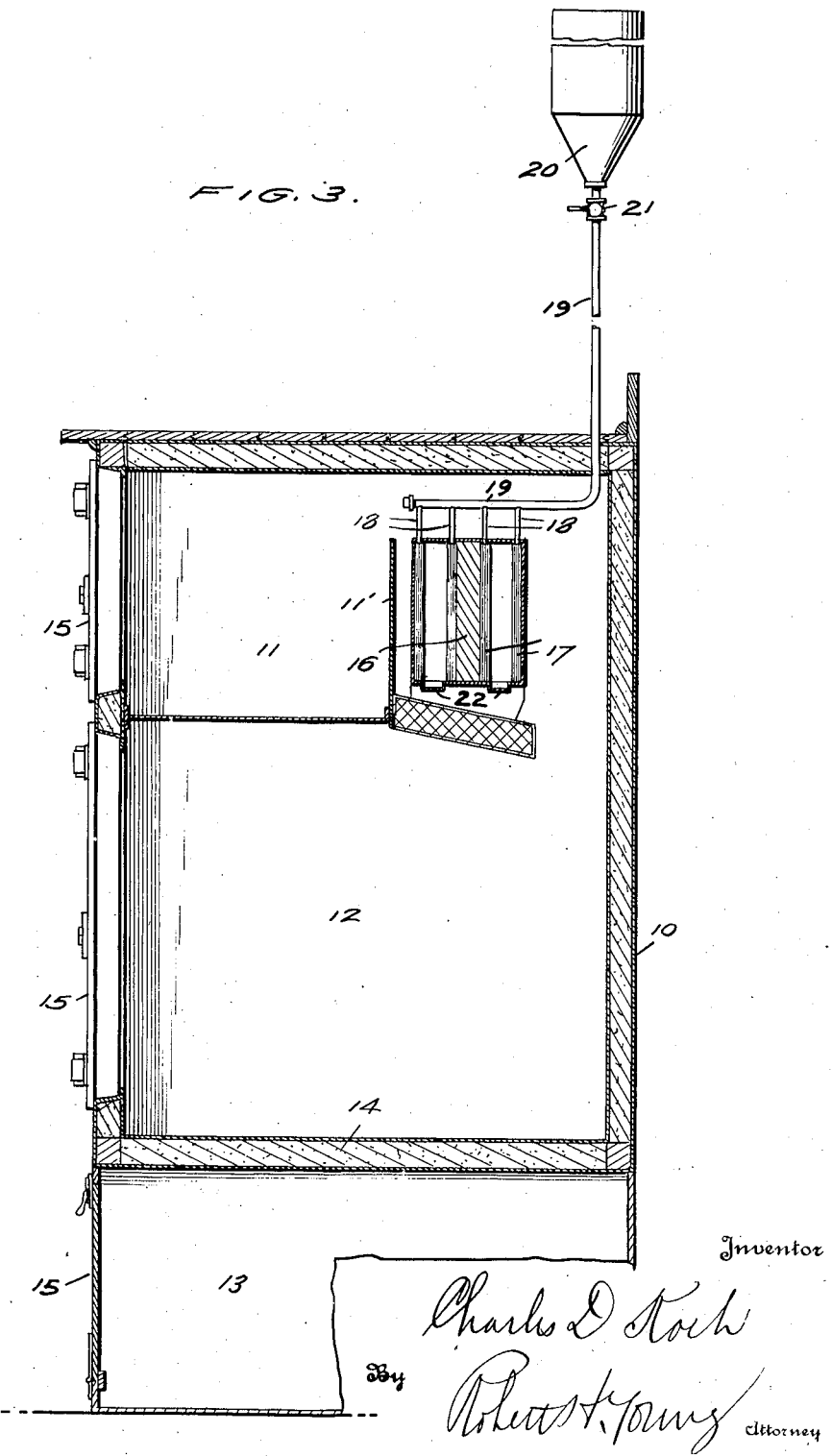

Patented July 14, 1931

1,814,315

UNITED STATES PATENT OFFICE

CHARLES D. KOCH, OF TORRESDALE, PENNSYLVANIA, ASSIGNOR TO KEYSTONE AIRCRAFT CORPORATION, OF BRISTOL, PENNSYLVANIA, A CORPORATION OF DELAWARE

REFRIGERATOR FOR VEHICLES

Application filed August 15, 1928. Serial No. 299,857.

This invention relates to a system for cooling and refrigerating foods and drink and is particularly adapted for use on airplanes and dirigible airships or to other conveyances which move rapidly such as railroad trains and steamships.

The invention has for its object to provide an efficient refrigerating system operated solely by the evaporation method and without the aid of mechanically operated refrigerating mechanism.

With this object in view the invention consists of the novel arrangement of an evaporating chamber located in an air passage. And the invention further consists of certain novel details of construction and combinations of parts all of which will be first fully described and afterwards specifically pointed out in the appended claims.

Referring to the accompanying drawings.

Fig. 1 is a horizontal sectional view through the skin of an airship or the like and through the refrigerating device, Fig. 2 is a front elevation of the refrigerating device and Fig. 3 is a transverse vertical sectional view through the same.

Like numerals of reference indicate the same parts throughout the several figures, in which:

1 indicates the skin of an airship, airplane or other fast moving conveyance, and 2 and 3 indicate openings spaced apart in said skin and in horizontal alinement with each other. Connecting said openings on the inside of the airship or the like, is an air duct or passage 4 preferably tapered from the ends toward the center 5 in order to create a Venturi action and increase the velocity of the air passing through the duct or passage in the direction of the arrows at the central portion 5 of the duct or passage 4.

At the intake opening 2 and the exhaust opening 3, there are provided adjustable gates 6 and 7, each formed like a scoop and pivoted at the points 8 and 9 so that the speed of the airship or the like causes air from the airstream to enter the intake gate 6 and to be drawn out at the exhaust gate 7 by an aspirating action which creates a minus pressure at the exhaust gate 7 and facilitates the flow of air through the duct or passage. By adjusting the extent of opening of these gates, the velocity of air flow may be controlled to increase or retard the refrigerating action of the device which will now be described.

10 indicates a refrigerator having refrigerating compartments such as 11 and 12 which may be superposed on a storage compartment 13 insulated from the refrigerating compartments 11 and 12, as by an insulating partition 14 forming the bottom of the lowermost refrigerating compartment 12. In fact it is desirable to insulate also the top, front, back and sides of the refrigerating compartments by any suitable means or material employed in the art of refrigerators, and also to provide for the refrigerating compartments and the storage compartment, suitable doors 15 for ready access to the interior of the device.

The reduced central portion 5 of the air duct or passage lies within the bunker 11' of the refrigerator preferably near the top thereof, as shown in the drawings.

Disposed vertically and longitudinally of the central portion 5 of the air duct or passage is a baffle member 16 which breaks up the air passing through the air duct or passage into two air streams and at the same time reduces the area of the air duct or passage to further increase the velocity of the air passing through the central portion 5 thereof.

Arranged preferably in staggered formation on both sides of the baffle member 16 and on the inside of the walls of air duct are a plurality of series of wicks, pads or strips 17 of a suitable absorbent material, or any other suitable arrangement of absorbent linings may be employed.

Connecting with the air duct or passage 4 within the refrigerator and directly above the wicks or layers 17 of absorbent material, is a battery of vertical feed or drip tubes 18 which connect with a feed pipe 19 passing from a supply tank 20, a shut-off cock 21 being provided at the bottom of the supply tank 20, as shown in the drawings.

Formed in the bottom of the air duct or passage 4 directly under the wicks or layers of absorbent material is one or more inclined troughs 22 connected on the outside of the refrigerator with a fluid drain pipe 23 leading to a suitable container (not shown).

Having thus described the several parts of the invention, its operation is as follows:

The device being assembled as shown and as herein described, a highly volatile liquid such as carbon tetrachloride, ether or the like is supplied to the supply tank 20, and by means of the feed pipe 19 and the drip tubes 18, is fed to the absorbent wicks or layers 17 slowly or rapidly as conditions may require or in accordance with the rate of refrigeration desired, the supply being controlled by the shut-off cock 21.

The passage of the airship or the like through the air causes a column of air to pass over the saturated wicks or layers 17 at high velocity and by proportionately rapid evaporation of the highly volatile liquid on the wicks or layers induces a rapid reduction of temperature within the air duct or passage and within the bunker 11' in the refrigerator. As the heat is drawn off in proportion to the amount of the volatile liquid evaporated and in proportion to the rapidity of such evaporation the rate of refrigeration and the temperature within the refrigerating compartments may be controlled by the adjustable gates 6 and 7 and by the shut-off cock 21, the former controlling the volume and velocity of the air passing through the air duct or passage 4 and the latter controlling the quantity of volatile liquid supplied for evaporation.

It will be seen that by this system of refrigeration, the fumes from the volatile liquid are wholly contained within the air duct or passage and are rapidly exhausted therefrom, so that the interior of the refrigerator, and its contents are free from contamination thereby, while the inclined troughs 22 receive all excess liquid which may drop from the wicks or layers 17 and deliver the same into the drain pipe 23 and thence to a container or receptacle therefor.

Having thus fully described the invention, it is to be understood that the same is not to be limited to the exact construction shown in the drawings and herein described, as the same is susceptible to changes in the construction and arrangement of the parts, and it is considered that the spirit of the invention clearly embraces all of such changes and modifications as fall within the limit and scope of the appended claims.

What is claimed as new and is desired to be secured by Letters Patent of the United States is:

1. A device of the character described including a structure open at both ends forming an air duct and adapted for application to the inner side of the skin of an airship or the like, the structure being tapered from the ends thereof toward the center and including movable gates at said open ends, the forward gate forming an air scoop to lead air into the air duct, the two gates acting to regulate the volume and velocity of air passing through the air duct, a refrigerator including a bunker, the central portion of the air duct being disposed within said refrigerator and lying within said bunker, a baffle member disposed longitudinally and vertically within the central portion of the air duct and breaking up the flow of air therethrough into two airstreams, a plurality of absorbent media within the central portion of the air duct and in the path of flow of air therethrough, a plurality of drip tubes entering the central portion of the air duct to deliver a volatile liquid to the absorbent media, a feed pipe and a supply tank for supplying such liquid to the drip tubes, and an inclined trough within the air duct for delivering the excess liquid to the outside of the refrigerator.

2. A device of the character described including a structure open at both ends forming an air duct and adapted for application to the inner side of the skin of an airship or the like, the said structure including movable gates at said open ends to regulate the volume and velocity of air passing through the air duct, a refrigerator including a bunker, a portion of the air duct being disposed within said refrigerator and lying within said bunker, a pluralty of absorbent media within the air duct, a plurality of drip tubes entering the aid duct to deliver a volatile liquid to the absorbent media, a feed pipe and a supply tank for supplying such liquid to the drip tubes, and an inclined trough within the air duct for delivering the excess liquid to the outside of the refrigerator.

3. A device of the character described including a structure open at both ends forming an air duct and adapted for application to the inner side of the skin of an airship or the like, the said structure including movable gates at said open ends to regulate the volume and velocity of air passing through the air duct, a refrigerator including a bunker, a portion of the air duct being disposed within said refrigerator and lying within said bunker, a plurality of absorbent media within the air duct a plurality of drip tubes entering the air duct to deliver a volatile liquid to the absorbent media, a feed pipe and a supply tank for supplying such liquid to the drip tubes.

4. A device of the character described including a structure open at both ends forming an air duct and adapted for application to the inner side of the skin of an airship or the like, the said structure including movable gates at said open ends to regulate the volume and velocity of air passing through the air duct, a refrigerator including a bunker, a portion of the air duct being disposed within said refrigerator and lying within said bunker, a plurality of absorbent media within the air duct and means for feeding a volatile liquid to the absorbent media.

5. A device of the character described including a structure open at both ends forming an air duct and adapted for application to the inner side of the skin of an airship or the like, the said structure including movable gates at said open ends to regulate the volume and velocity of air passing through the air duct, a refrigerator including a bunker, a portion of the air duct being disposed within said refrigerator and lying within said bunker, absorbent material within the air duct, and means for feeding a volatile liquid to the absorbent material.

6. A device of the character described including a structure open at both ends forming an air duct and adapted for application to the inner side of the skin of an airship or the like, the said structure including movable gates at said open ends to regulate the volume and velocity of air passing through the air duct, a refrigerator, a portion of the air duct being disposed within the refrigerator, absorbent material within the air duct and means for feeding a volatile liquid to the absorbent material.

7. In combination with an airship a device of the character described including a structure open at both ends forming an air duct and adapted for application to the inner side of the skin of an airship or the like, the said ends of the structure opening through the skin of an airship or the like at different points thereon, means for regulating the volume and velocity of air passing through the air duct, a refrigerator, a portion of the air duct being disposed within the refrigerator, absorbent material within the air duct and means for feeding a volatile liquid to the absorbent material.

8. In combination with an airship a device of the character described including a structure open at both ends forming an air duct and adapted for application to the inner side of the skin of an airship or the like, the said ends of the structure opening through the skin of an airship or the like at different points thereon, a refrigerator, a portion of the air duct being disposed within the refrigerator, absorbent material within the air duct, and means for feeding a volatile liquid to the absorbent material.

9. In combination with an airship a device of the character described including a structure open at both ends forming an air duct and adapted for application to the inner side of the skin of an airship or the like, the said ends of the structure opening through the skin of an airship or the like at different points thereon, a refrigerator, a portion of the air duct being disposed within the refrigerator, and means for feeding a volatile liquid within the air duct.

10. In combination with an airship a device of the character described including a structure open at both ends forming an air duct and adapted for application to the inner side of the skin of an airship or the like, the said ends of the structure opening through the skin of an airship or the like at different points thereon, a refrigerator, a portion of the air duct being disposed within the refrigerator.

11. In combination with an airship a device of the character described including a structure open at both ends forming an air duct and adapted for application to the inner side of the skin of an airship or the like, the said ends of the structure opening through the skin of an airship or the like at different points thereon, and means for introducing a volatile liquid to the interior of the air duct.

12. In combination with an airship a device of the character described including a structure having two ends opening through the skin of an airship or the like at two different points thereon forming an air duct and means for introducing a volatile liquid to the interior of the air duct.

In testimony whereof I affix my signature.

CHARLES D. KOCH.